United States Patent [19]

Mukai et al.

[11] Patent Number: 4,705,382

[45] Date of Patent: Nov. 10, 1987

[54] FLASH PHOTOGRAPHING APPARATUS

[75] Inventors: Hiromu Mukai, Kawachinagano; Toshio Yamaki, Osaka; Akihiko Fujino; Shuji Izumi, both of Sakai; Masaaki Nakai, Kawachinagano; Nobuyuki Taniguchi, Nishinomiya, all of Japan

[73] Assignee: Minolta Camera Kabushiki Kaisha, Osaka, Japan

[21] Appl. No.: 918,077

[22] Filed: Oct. 14, 1986

[30] Foreign Application Priority Data

Oct. 16, 1985 [JP] Japan .................................. 60-230514
Oct. 17, 1985 [JP] Japan .................................. 60-232499
Oct. 18, 1985 [JP] Japan .................................. 60-233835

[51] Int. Cl.$^4$ ...................... G03B 7/097; G03B 7/099; G03B 7/28; G03B 15/05
[52] U.S. Cl. .................................... 354/412; 354/402; 354/416; 354/432; 354/460
[58] Field of Search ............... 354/402, 412, 416, 432, 354/460

[56] References Cited

U.S. PATENT DOCUMENTS 4,285,584  8/1981  Canter ................................. 354/432
4,429,969  2/1984  Saegusa ........................... 354/432 X Primary Examiner—Michael L. Gellner
Attorney, Agent, or Firm—Burns, Doane, Swecker & Mathis

[57] ABSTRACT

A flash photographing apparatus, including a camera and an electronic flash device, comprises a plurality of photoelectric elements for measuring brightness of a main and sub objects to be photographed. A diaphragm aperture value and shutter speed value of the camera are controlled according to the brightness of the sub object. A quantity of flash light emission is controlled according to a difference between the brightness information of the main and sub objects.

12 Claims, 17 Drawing Figures

Fig. 3
| $SPc_1$ $(Bv_1)$ | $SPc_2$ $(Bv_2)$ | $SPc_3$ $(Bv_3)$ |
|---|---|---|
| $SPc_4$ $(Bv_4)$ | $SPc_5$ $(Bv_5)$ | $SPc_6$ $(Bv_6)$ |
| $SPc_7$ $(Bv_7)$ | $SPc_8$ $(Bv_8)$ | $SPc_9$ $(Bv_9)$ |
SP
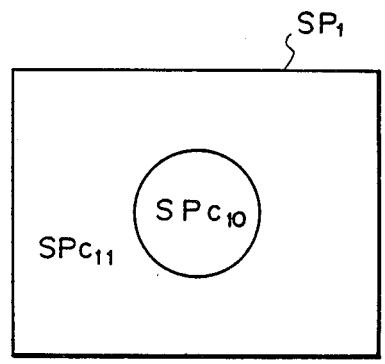
Fig. 11
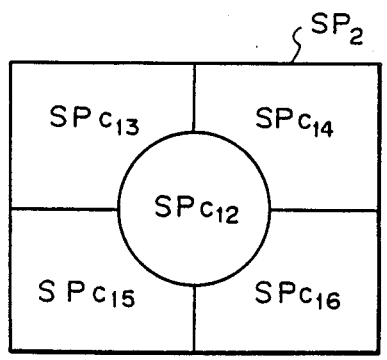
Fig. 12

FLASH PHOTOGRAPHING APPARATUS

BACKGROUND OF THE INVENTION

1. Field of the Invention

This invention relates to a flash photographing apparatus, and more particularly to such an apparatus including light measuring means for measuring brightness of an object to be photographed and means for controlling exposure and a quantity of flash light emission in a flash mode according to the light measurement.

2. Description of the Related Art

In such a flash photographing apparatus, in fill-in-flash photographing, a quantity of the flash light emission is controlled so as to be underexposure by a predetermined value with respect to a proper exposure value. Another known type is that a sum of the quantities of the ambient light and a preliminary flash light is precisely determined precedently the actual exposure and the exposure is controlled according thereto. Also, a quantity of a preliminary flash light is monitored in correspondence to conditions of the object and the exposure is controlled according to the monitored quantity of flash emission.

Also, U.S. Pat. No. 4,514,073 discloses a flash photographing apparatus including light measuring means, which is changeable either average or spot light measurement, and means for controlling a quantity of the flash light emission according to the average light measurement. U.S. Pat. No. 4,291,979 discloses a flash photographing apparatus, in which light measurement in both flash and flashless conditions are effected at a different timing, and a diaphragm aperture value and shutter speed value are determined on the basis of the quantities of the light measurements of the ambient and flash light. U.S. Pat. No. 4,367,932 discloses a flash photographing apparatus, in which either one of a quantity of flash light emission, a diaphragm aperture value, and a shutter speed value is previously set and the other factors are automatically controlled. U.S. Pat. No. 4,550,996 discloses a flash photographing apparatus, in which, according to average light measurement, the exposure with the ambient light is controlled to be underexposure by a predetermined value and a quantity of flash light emission is controlled to be under by a predetermined value with respect to a proper exposure value respectively. U.S. Pat. No. 4,373,793 discloses a flash photographing apparatus, in which a quantity of a preliminary flash light is measured in a plurality of photographing points (areas), and a quantity of flash emission, a diaphragm aperture value, and a shutter speed are controlled so as to obtain a desired contrast.

SUMMARY OF THE INVENTION

An object of the present invention is to provide a flash photographing apparatus, capable of properly controlling flash light and ambient light according to the brightness of the object.

Another object of the present invention is to provide a flash photographing apparatus, capable of controlling flash light without preliminary flashing.

Further object of the present invention is to provide a flash photographing apparatus, capable of properly controlling exposure according to a sum of ambient and flash light, particularly suitable for daylight flash photography or "rear light" photography.

According to one aspect of the present invention, there is provided a flash photographing apparatus including a camera and an electronic flash device, comprising: first light measuring means for measuring a brightness of light incident from a main object in a particular light receiving region within a camera photographing area and outputting first brightness information in response to this light measurement; second light measuring means for measuring a brightness of light incident from a sub object in a region within said camera photographing area other than said particular light receiving region and outputting second brightness information in response to this light measurement; first means for calculating exposure control data for flash photography on the basis of the second brightness information; means for controlling a diaphragm aperture and shutter speed of said camera according to the exposure control data; second means for calculating data for controlling a quantity of flash light emission according to difference between the first and second brightness information; and, means for controlling the quantity of flash light emission on the basis of the flash emission control data.

With this invention, a proper exposure with ambient light and flash light can be obtained regardless to the brightness of the main object, even if a difference between the brightness of the main object and the brightness of the sub object exceeds a given value, such as daylight flash photography or "rear light" photographing conditions, since the difference between said first and second brightness information is taken into consideration.

In another aspect of the present invention, there is provided a flash photographing control apparatus, comprising: a plurality of light measuring means for measuring a plurality of brightness, respectively, of incident light received by a plurality of light receiving regions corresponding to a plurality of divided picture areas and outputting a plurality of brightness signals corresponding to the respective measurements; means for outputting a brightness signal among the plurality of brightness signals; means for integrating the maximum brightness signal during flashing; and, means for controlling a quantity of flash light emission so that flashing is stopped when the integrated value reaches a predetermined value. This makes it possible that a main object can be photographed in proper exposure, regardless to the position of the main object in the viewfinder, since it is usually deemed that the main object, to which flash light is most desirably irradiated, is located at the nearest position from the camera.

BRIEF DESCRIPTION OF THE DRAWINGS

FIG. 3 is a view illustrating an arrangement pattern of multidivided photoelectric elements;

FIGS. 11 and 12 are views illustrating another arrangement patterns of multidivided photoelectric elements;

DESCRIPTION OF THE PREFERRED EMBODIMENTS

Figure 1:
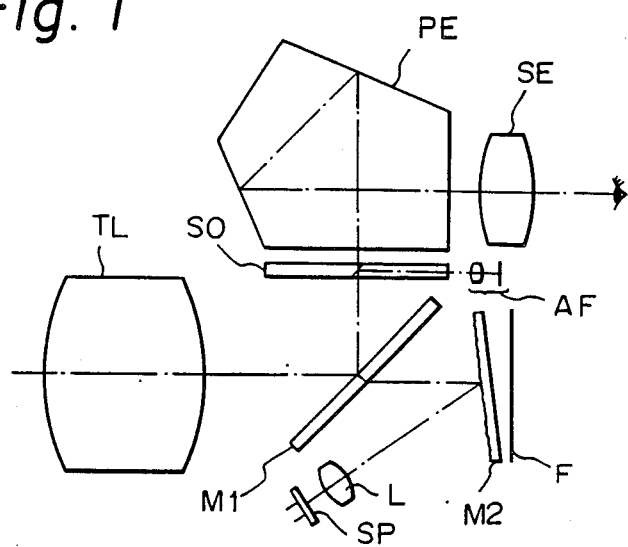
FIGS. 1 and 2 are schematic illustrations of an optical system of a flash photographing apparatus.
Figure 2:
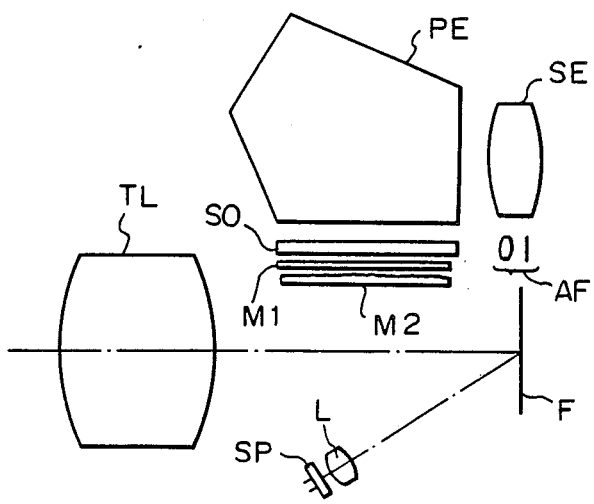

In FIGS. 1 and 2, an optical system of a single lens reflex camera with a focal plane shutter mechanism is schematically illustrated, in which reference mark TL indicates photographing lens; M1, a main reflex mirror having a half transparency portion; M2, a sub reflex mirror; F, a film; SO, a focal plate; PE, a pentaprism; SE, eye piece; AF, means for detecting focus condition of the photographing lens TL; L, a condenser lens; and SP, multidivided photoelectric elements for measuring light coming from an object to be photographed.

The multidivided photoelectric elements SP comprise nine light receiving elements $SP_{c1}$ to $SP_{c9}$ arranged laterally and longitudinally in a lattice, as seen from FIG. 3. A flash mode photographing is effected when an electronic flash device is mounted on the camera body and the preparatory operation for the flash light emission of the flash device is completed, e.g., the charging of a main capacitor (not shown) of the flash device exceeds a given level.

Light passed through the photographing lens TL is splited or divided by the main mirror M1 into a viewfinder system and a light measuring system. Light to the viewfinder system passes through the focal plate SO, the pentaprism PE, and the eye piece SE and is observed by a man's eye. A part of light to the focal plate SO is received by the focus condition detecting means AF to detect the focus condition of the photographing lens TL. Light transmitted through the main mirror M1 is reflected and diffused at the sub mirror M2 and received by the multidivided photoelectric elements SP via the condenser lens L. A diaphragm aperture value Av and a shutter speed value Tv are calculated in accordance with a brightness Bv of the object detected by the multidivided photoelectric elements SP.

When the shutter mechanism is released, the precedingly calculated diaphragm aperture value Av and shutter speed value Tv are stored, or locked, as well as the main mirror M1 and the sub mirror M2 are raised up, as seen from FIG. 2. At the time of flash light emission, light (ambient light and flash light) reflected at the surface of the film F is monitored by the multidivided photoelectric elements SP. When the integration of the light received by the multidivided photoelectric elements SP reaches a predetermined value, the flashing is terminated or stopped.

Figure 4:
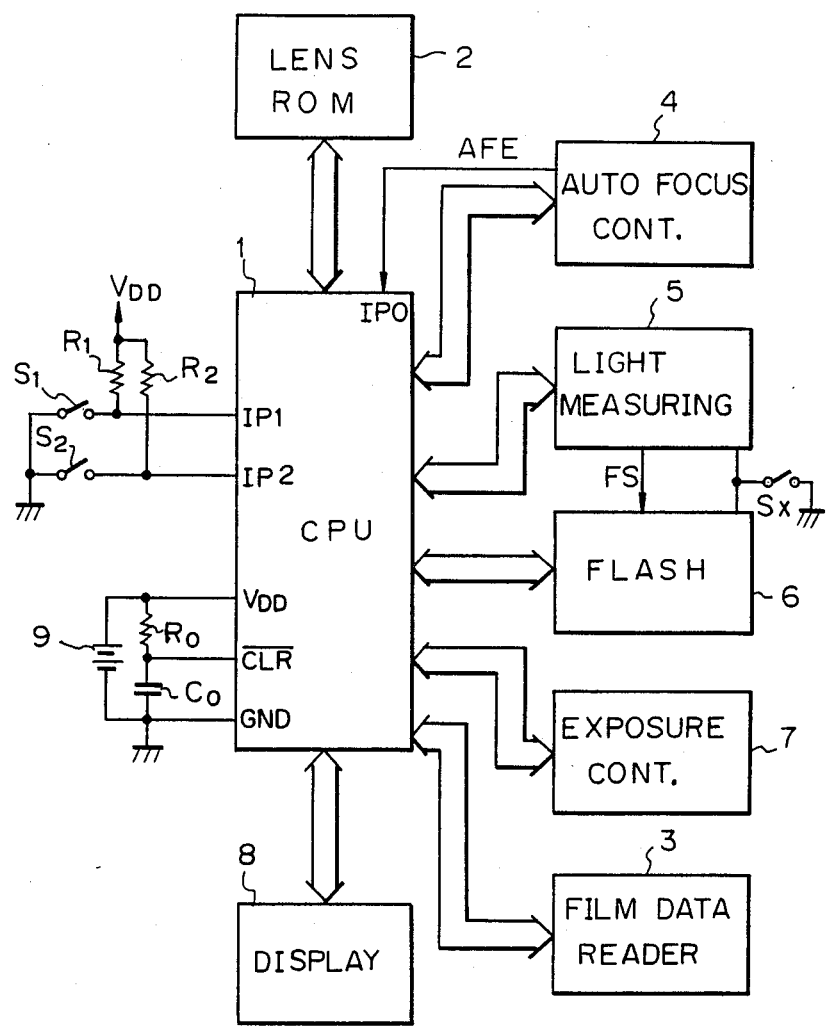
FIG. 4 is a block diagram of the flash photographing apparatus.
Figure 6:
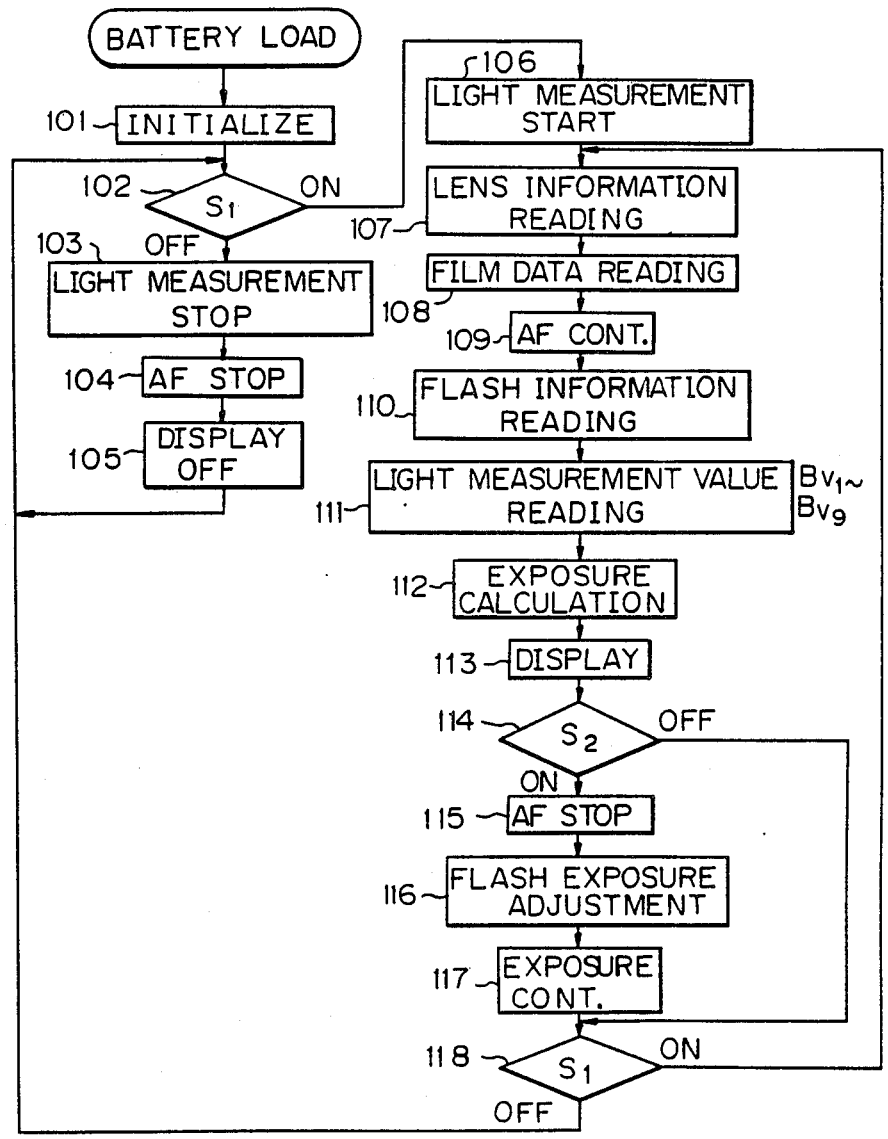
FIG. 6 is a flow chart showing the operation of a CPU shown in FIG. 4.

FIG. 4 is a block diagram showing a circuit construction of a flash photographing apparatus, in which reference numeral 1 indicates a microcomputer (hereinafter referred to as "CPU"), for controlling the overall parts of this flash photographing apparatus; 2, a lens ROM provided in the photographing lens for outputting lens information thereof; 3, a DX code reader for automatically reading a DX code representing film data provided on the surface of a film cartridge; 4, an autofocussing controller; 5, a light measuring means; 6, an electronic flash device; 7, an exposure controller; and 8, a display. A light measuring switch $S_1$ is closed by depression turned on at a first stroke of a shutter release button (not shown); a release switch $S_2$ is closed by depression of the shutter button to the second stage. The light measuring means 5 includes the multidivided photoelectric elements SP shown in FIG. 1, which are operatively connected to the exposure controller 7. The autofocussing controller 4 includes the focus condition detecting means AF shown in FIG. 1. A power-on reset circuit composed of a resistor $R_0$ and a capacitor $C_0$ temporalily makes the potential at a clear terminal $\overline{CLR}$ of CPU 1 to "L" level when a power source battery 9 is loaded in the camera. The CPU 1 is constituted so that a reset routine of steps 101 to 105 as shown in FIG. 6, is executed when the potential at the clear terminal $\overline{CLR}$ of CPU 1 is temporalily turned to "L" level. On the other hand, the potential on a signal line AFE to transmit a focus condition detection signal to the CPU 1 is turned to "H" level, when the autofocussing is completed by the autofocussing controller 4. An X contact or flash synchronization switch Sx is closed to start flash light emission, when the shutter mechanism is fully opened. The potential on a signal line FS to output a signal, "H" level, to the flash 6 for stopping an interrupting the flash light emission, when the integration of the light measurement reaches a predetermined value.

Figure 5:
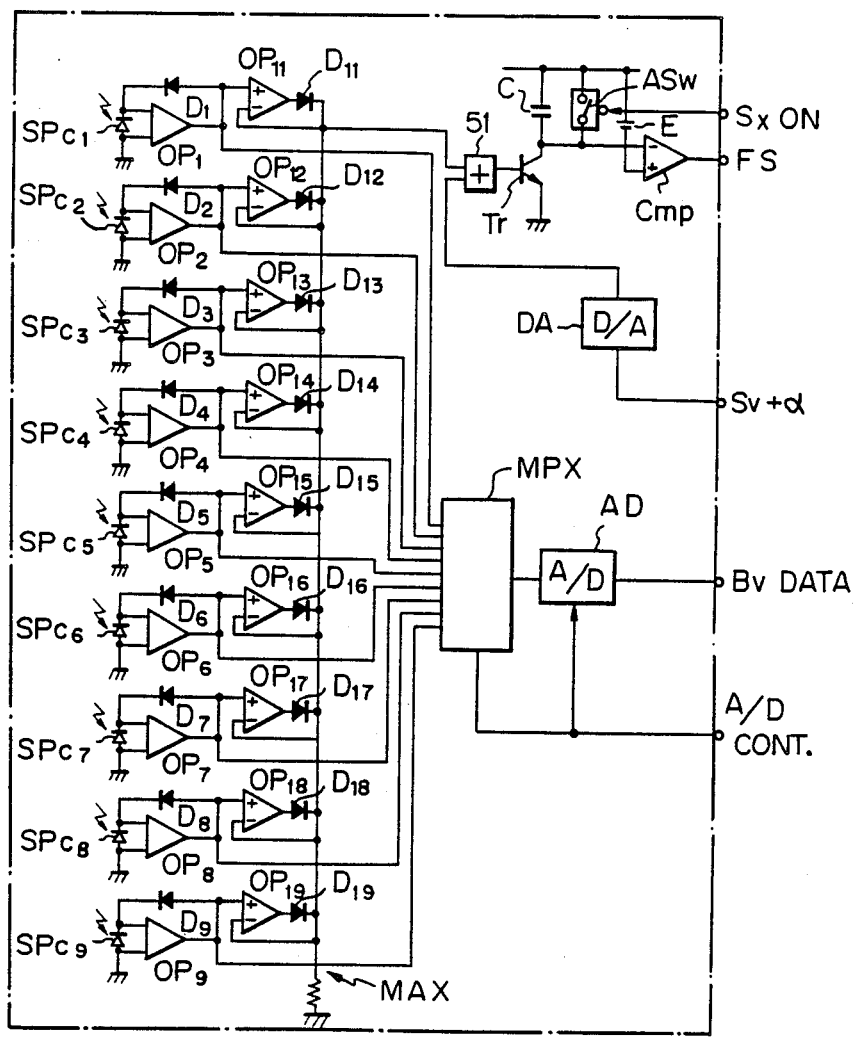
FIG. 5 is a circuit diagram of a light measuring circuit shown in FIG. 4.

FIG. 5 is a block circuit diagram of the light measuring means 5, in which $OP_1$ to $OP_9$ indicate head amplifiers to which the respective light receiving elements $SP_{c1}$ to $SP_{c9}$ shown in FIG. 3 are connected, respectively. $D_1$ to $D_9$ are logarithmic compression diodes provided in negative feedback loops of the head amplifiers $OP_1$ to $OP_9$, respectively. Output terminals of the head amplifiers $OP_1$ to $OP_9$ are connected to input terminals of a multiplexer MPX, respectively. Output terminal of the multiplexer MPX is connected to input terminal of an A/D converter AD and output terminal of the A/D converter AD is connected to object brightness data input terminals of CPU 1.

An A/D converter control terminal of CPU 1 which is set "H" level in response to the closure of the light measuring switch $S_1$ is connected to the multiplexer MPX and the A/D converter AD. The data of object brightnesses $Bv_1$ to $Bv_9$ measured by the multidivided light receiving elements $SP_{c1}$ to $SP_{c9}$ are input, in turn, into the A/D converter AD via the multiplexer MPX and, after converted A/D, input to CPU 1.

Output terminals of the head amplifiers $OP_1$ to $OP_9$ are connected to non-inverted input terminals of operational amplifiers $OP_{11}$ to $OP_{19}$, respectively, and inverted input terminals of the operational amplifiers $OP_{11}$ to $OP_{19}$ are connected to cathodes of diodes $D_{11}$ to $D_{19}$, respectively. Anodes of the diodes $D_{11}$ to $D_{19}$ are connected to output terminals of the operational amplifiers $OP_{11}$ to $OP_{19}$, respectively. The cathodes of the diodes $D_{11}$ to $D_{19}$ are connected to each other, so that the diodes $D_{11}$ to $D_{19}$ and the operational amplifiers $OP_{11}$ to $OP_{19}$ cooperatively constitute a maximum value output circuit MAX.

The maximum value output circuit MAX per se is well known. For instance, if the output of the light receiving element $SP_{c1}$ is larger than those of the other light receiving elements $SP_{c2}$ to $SP_{c9}$, the output of the maximum value output circuit MAX is defined by the outputs of the operational amplifier $OP_{11}$ and the diode $D_{11}$. The level of the inverted input terminals of the other operational amplifiers $OP_{12}$ to $OP_{19}$ is larger than the level of the non-inverted input terminals thereof and, therefore, the output of the operation amplifiers $OP_{12}$ to $OP_{19}$ is in "L" level and the diodes $D_{12}$ to $D_{19}$ are not electrically connected to each other. Consequently, only the diode $D_{11}$ is electrically connected and a signal is output only from the circuit of the operational amplifier $OP_{11}$ and the diode $D_{11}$, corresponding to the light receiving element $SP_{c1}$ of which output is maximum.

An adder circuit 51 receives the output of the maximum value output circuit MAX and the output of a D/A converter DA and produces the sum of the both outputs. The D/A converter DA receives from CPU 1 a digital data $(Sv+\alpha)$ representing the sum of the film speed or film sensitivity value Sv and compensation or adjustment value $\alpha$ for the control fo flash light amount, and converts the data into analog voltage. The output terminal fo the adder circuit 51 is connected to a base of logarithmic expanding transistor Tr. A collector of the transistor Tr is connected via an integral capacitor C to a direct current power source and an emitter of the transistor Tr is connected to the ground. A normally closed analog switch $AS_w$ is connected in parallel with the integral capacitor C. This analog switch $AS_w$ is opened when the synchronizing terminal Sx is closed.

A junction between the integral capacitor C and the collector of the transistor Tr is connected to are input terminal of the comparator Cmp. Constant voltage source E is connected to another input terminal of the comparator Cmp. An output terminal of the comparator Cmp is connected to the signal line FS which outputs a signal for stopping the flash emitting.

Operation of the above-mentioned flash photographing apparatus will now be described.

When the light measuring switch $S_1$ is closed by the depression of the shutter release button to the first stage, the CPU 1 reads from the lens ROM 2 a full open diaphragm aperture value $AV_0$ and the other lens information, and reads from the DX code reader 3 the data of film sensitivity Sv. And then, the CPU 1 actuates the autofocus controller 4 to start automatic focussing and also reads from the electronic flash device 6 an information as to whether the preparatory for the flash light emission, i.e., the charging of the main capacitor, is completed. The automatic focussing is effected by receiving at the focus condition detecting means AF the light passed through the photographic lens TL, the main mirror M1 and the focus plate SO.

The CPU 1 supplies the power to the respective head amplifiers $OP_1$ to $OP_9$ when the light measuring switch $S_1$ is closed and outputs a start signal to the multiplexer MPX and the A/D converter AD. Thus, based on the light passed through the photographic lens TL, the main mirror M1, the sub mirror M2, and the condenser lens L, and received by the nine light receiving elements $SP_{c1}$ to $SP_{c9}$ of the multidivided photoelectric elements SP, the data of brightnesses $Bv_1$ to $Bv_9$ of the object are input, in turn, via the multiplexer MPX to the A/D converter AD in which the data are converted to digital signals and input to CPU 1, in turn.

The CPU 1 calculates the diaphragm aperture value Av and shutter speed value Tv on the basis of object brightnesses $Bv_1$ to $Bv_9$ input within one sampling-period. This operation will be discussed hereinafter in detail. Then, the display 8 is operated to display the results of the calculation.

When the lens is moved to an in-focus position by the autofocus controller 4, the controller 4 outputs a motor stop signal to a lens motor (not shown) for driving a focus adjusting mechanism (not shown) of the photographic lens LE to fix the lens in the in-focus position and also outputs an in-focus signal to CPU 1 via the signal line AFE.

When the release switch $S_2$ is closed by the depression of the shutter release button to the second stage, CPU 1 outputs a focussing stop signal to the autofocus controller 4 to stop the autofocussing operation irrespective of the focus condition detection of the AF means. Then, CPU 1 executes an operation for adjusting the quantity of flash light. The adjusting operation will be described in detail hereinafter. Upon the release switch $S_2$ being closed, the exposure controller 7 starts automatic diaphragm aperture setting and the opening of the diaphragm aperture is fixed when it becomes to a value corresponding to a diaphragm aperture value Av to be controlled.

At the same time, in relation to the depression of the shutter release button to the second stage, the main mirror M1 and the sub mirror M2 are raised up and the travel of the preceding or front shutter curtain is initiated. Upon the completion of the travel of the preceding shutter curtain, the X contact Sx is closed and the analog switch $AS_w$ is now opened. After these mirrors are raised up, light from the object is reflected at the surface of the film F and received by the multi-divided photoelectric elements SP.

The maximum value among the nine light measurements from the multidivided photoelectric elements SP is output from the maximum value output circuit MAX and both this maximum value and the output $(Sv+\alpha)$ from the D/A converter DA are added at the adder circuit 51. The transistor Tr is driven by this adding value. However, during the analog switch $AS_w$ is closed, the integral capacitor C is not charged. Electric charge to the integral capacitor C is effected, just after the X contact Sx is closed and the analog switch $AS_w$ is opened, so that electric charge is accumulated in the integral capacitor C at a speed corresponding to the maximum value signal and adjusted data $(Sv+\alpha)$ from the D/A converter DA. An analog voltage corresponding to a proper exposure level is produced from the constant voltage source E to the comparator Cmp. The adjusted data $(Sv+\alpha)$ will be discussed later with reference to FIG. 8.

Therefore, when a charged voltage in the integral capacitor C becomes to the analog voltage from the constant voltage source E, the output of the comparator Cmp is reversed and a flashing stop signal is output to the electronic flash device 6 via the signal line FS to stop the flash light emission.

In response to the start of the movement of the preceding shutter curtain counting time is started. When a count becomes a value corresponding to a shutter speed value Tv to be controlled, the trailing or rear shutter curtain moves to terminate the exposure.

FIG. 6 is a flow chart illustrating the operation of the CPU 1 from battery loading until flash and exposure controlling. At step 101 the circuits in FIG. 4 are initialized and at step 102 whether the light measuring switch $S_1$ is turned on or off is checked. If it is off, at step 103 the light measurement is stopped, at step 104 automatic focussing is stopped, and at step 105 displaying various information is also stopped.

If the light measuring switch $S_1$ is on at step 102, then at step 106 the light measurement is started. Then, at step 107 the lens information, i.e., the full open diaphragm aperture value $Av_0$ is read out and at step 108 the DX code, i.e., the film sensitivity value $Sv$ is read out. At step 109 autofocussing is conducted and at step 110 flash information, i.e., a charge completion signal is read out. At step 111, the object brightnesses $Bv_1$ to $Bv_9$ measured by the nine light receiving elements $SP_{c1}$ to $SP_{c9}$ constituting the multidivided photoelectric elements SP are read out and at step 112 a diaphragm aperture value Av and shutter speed Tv to be controlled are calculated on the basis of the light measurements, as will be described later with reference to FIG. 7. At step 113 the exposure control information, such as the diaphragm aperture value Av and shutter speed value Tv calculated at step 112 and the other information are displayed.

Then, at step 114 whether the release switch $S_2$ is on is checked. If it is on, at step 115 the autofocussing is stopped and at step 116 adjusting operation for flash light quantity is conducted, as will be described later with reference to FIG. 8. Then, at step 117 exposure control is conducted on the basis of the diaphragm aperture value Av and shutter speed value Tv calculated at step 112.

On the other hand, in the check at step 114, if the release switch $S_2$ is off, the operation directly jumps to step 118 and whether the light measuring switch $S_1$ is on or off is checked. If the light measuring switch $S_1$ is still continuously on, the operation returns to step 107 and a series of operations (steps 107 to 117) for exposure control are repeated. If the light measuring switch $S_1$ is off, the operation returns to step 102.

Figure 7:
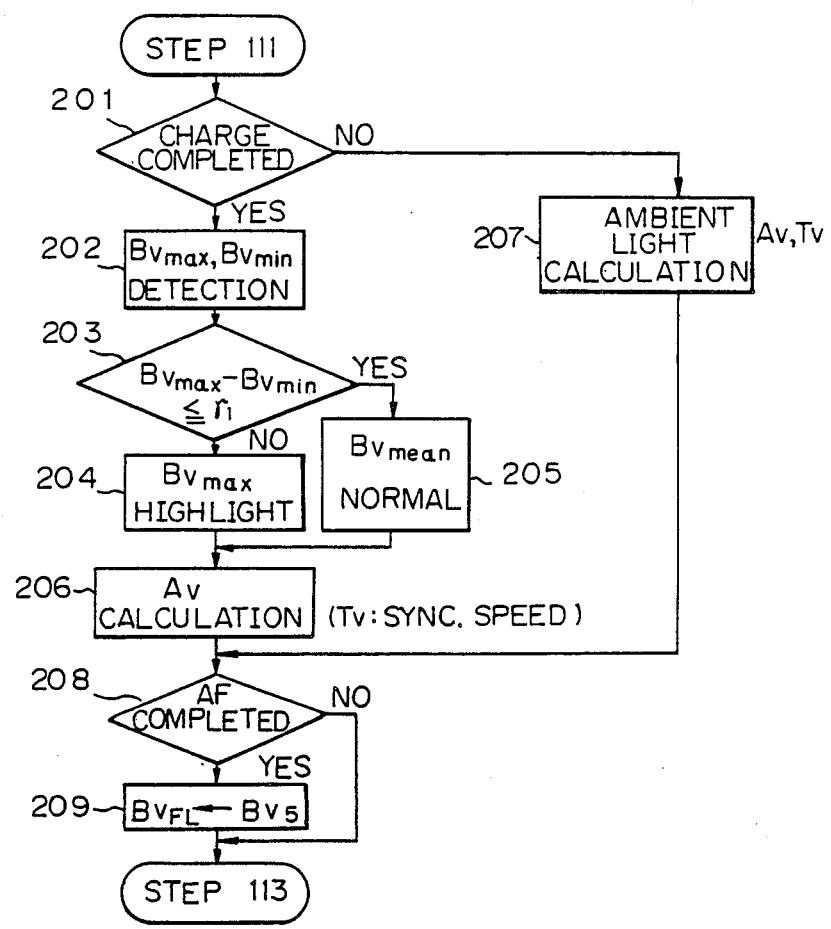
FIG. 7 is a detailed flow chart of calculation for the exposure control data shown in FIG. 6.

FIG. 7 is a flow chart illustrating detailed flow for calculating the diaphragm aperture value Av and shutter speed value Tv conducted at step 112. At step 201 whether the charging of the main capacitor of the flash device 6 has reached a given level or not is checked. If the charge is completed, i.e., the camera exposure control mode is in the flash mode, the operation moves to step 202, where the maximum brightness $Bv_{max}$ and the minimum brightness $Bv_{min}$ are detected among the object brightnesses $Bv_1$ to $Bv_9$ measured by the nine light receiving elements $SP_{c1}$ to $SP_{c9}$, respectively. The brightnesses $Bv_1$ to $Bv_9$ are obtained on the basis of the light reflected at the sub mirror M2.

Then, at step 203 the difference between the maximum brightness $Bv_{max}$ and the minimum brightness $Bv_{min}$ is calculated and whether the difference is larger than a predetermined value $\gamma_1$ or not is checked. The value $\gamma_1$ is usually 2 to 4, although it depends on the numbers of the multidivided photoelectrical elements SP and any other factors. If the maximum brightness $Bv_{max}$ is larger than a constant k, for example k=11, in which it is considered that the sun exists within the view area, $Bv_{max}$ is limited to k to avoid the main object from being to be underexposure.

If $Bv_{max} - Bv_{min} > \gamma_1$ at step 203, it is considered that the photographing condition is daylight synchronization or rear light. That is, sky or clouds occupies large part of the viewfinder. In this condition, at step 204 it is decided to use the maximum brightness $Bv_{max}$ as a high-light exposure standard. If a shifting value from highlight to normal exposure standard is assumed to be W, an exposure value Ev can be calculated by using the maximum brightness $Bv_{max}$ as follows.

$$Ev = (Bv_{max} - W) + Sv$$

Thus, even if sky or clouds occupies large part of the viewfinder, the high brightness condition can be photographed as it be. The shifting value W is determined on the basis of various experimental results and appropriate to be 1.5 to 3, although it depends on a latitude of the film F and the numbers of the multidivided photoelectrical elements SP.

If the difference between the maximum brightness $Bv_{max}$ and the minimum brightness $Bv_{min}$ measured by the nine light receiving elements $SP_{c1}$ to $SP_{c9}$ at step 111 is small, i.e. if $Bv_{max} - Bv_{min} \leq \gamma_1$ at step 203, it makes no substantial difference to use either one of brightnesses $Bv_1$ to $Bv_9$ measured by the nine light receiving elements $SP_{c1}$ to $SP_{c9}$. However, in this embodiment, an average value $Bv_{mean}$ of nine brightnesses $Bv_1$ to $Bv_9$ is used to more precisely regulate.

$$Bv_{mean} = \sum_{i=1}^{9} Bv_i / 9$$

Consequently, if $Bv_{max} - Bv_{min} \leq \gamma_1$, at step 205 it is decided that average value $Bv_{mean}$ is used as a normal exposure standard to calculate the exposure value Ev. That is, $$Ev = Bv_{mean} + Sv$$

After the exposure value Ev is calculated at step 204 or 205, the operation moves to step 206 and a diaphragm aperture value Av to be controlled is calculated as follows.

$$Av = Ev - Tv$$

That is, If $Bv_{max} - Bv_{min} > \gamma_1$, $$Av = (Bv_{max} - W) + Sv - Tv_x$$

and if $Bv_{max} - Bv_{min} \leq \gamma_1$, $$Av = Bv_{mean} + Sv - Tv_x$$

However, if the calculated diaphragm aperture value Av is smaller than the full open diaphragm aperture value $Av_0$ ($Av < Av_0$), Av should be set to $Av_0$ ($Av = Av_0$). If the calculated diaphragm aperture value Av is larger than a predetermined diaphragm aperture value $Av_x$ ($Av \geq Av_x$), Av should be set to $Av_x$ ($Av = Av_x$). Consequently, the range of diaphragm aperture value is limited as above, since, if the calculated diaphragm aperture value Av becomes too large (i.e., diaphragm aperture opening is too small), the quantity of flash light reaching the film F becomes too small. The predetermined diaphragm aperture value $Av_x$ is usally 6 to 8.

The shutter speed vlaue $Tv_x$ is a flash synchronizable shutter speed and, in case of selectable within 1/60 to 1/250 (sec.), if $Bv_{max} - Bv_{min} > \gamma_1$, the shutter speed value $Tv_x$ is selected as 1/250 (sec.), and if $Bv_{max} - Bv_{min} \leq \gamma_1$, the shutter speed value $Tv_x$ is selected as 1/60 (sec.). Thus, the diaphragm aperture value Av and the shutter speed value $Tv_x$ in the flash mode are determined according to the above mentioned routine.

On the other hand, if at step 201 the camera is in an ambient light mode, the operation moves to step 207 without charging the flash power. At step 207, the diaphragm aperture value Av and shutter speed value $Tv_x$ under the ambient light mode are calculated according to a known calculation. In this case, either spot or average light measurement can be applied to the measurement of the brightness of object.

After step 206 or 207 it moves to step 208, in which whether the autofocussing is completed is checked. If the autofocussing is still incomplete, the operation moves to step 209, in which the object brightness $Bv_5$ measured by the central light receiving element $SP_{c5}$, light receiving area thereof including a focus detecting area, is stored in the flash light control resistor $Bv_{FL}$. The central object brightness $Bv_5$ stored in this flash light control resistor $Bv_{FL}$ are renewed, in turn, until the autofocussing is completed or the shutter mechanism is released.

After the autofocussing is completed, no operation of step 209 is executed. Consequently, the central object brightness $Bv_5$ at the time when the autofocussing is completed is locked as an object brightness $Bv_{FL}$ ($Bv_5$) for controlling flash light. This is based on the fact that the central object at the time when the autofocussing is completed can be deemed as a main object. After step 208 or 209, it moves to step 113.

Figure 8:
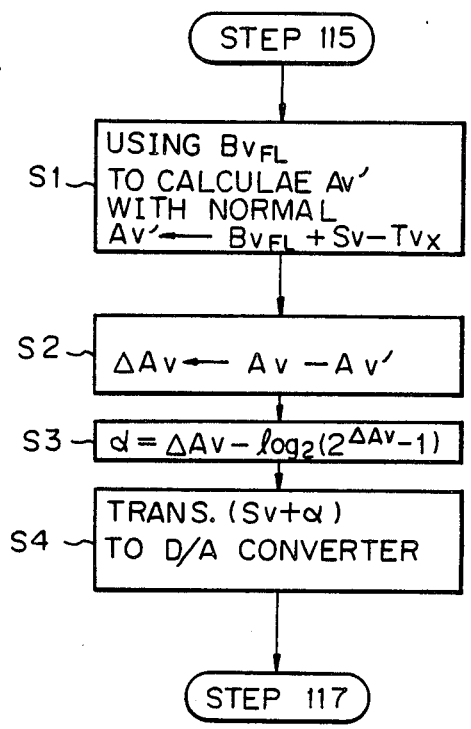
FIG. 8 is a detailed flow chart of calculation for adjusting quantity of flash emission shown in FIG. 6.

FIG. 8 is a flow chart illustrating detailed flow for calculating the adjusting quantity of flash light conducted at step 116. The object brightness $Bv_{FL}$ for controlling flash light is the object brightness $Bv_5$ measured by the central light receiving element $SP_{c5}$ and is suspected as a brightness of the main object based only on ambient light.

Therefore, at step S1 a diaphragm aperture value $Av'$ which guarantees a proper exposure only with ambient light is calculated by using the object brightness $Bv_{FL}$ (=$Bv_5$) for controlling flash light. The diaphragm aperture value $Av'$ is calculated as follows.

$$Av' = Bv_{FL} + Sv - Tv_x$$

At step S2 the difference $\Delta Av$ between the diaphragm aperture value Av at flash mode and the diaphragm aperture value $Av'$ in case of only ambient light is calculated as follows.

$$\Delta Av = Av - Av'$$

The operation for calculating the adjusting quantity of flash light will now be described. In a lenear system, a proper exposure only with the flash light can be determined as follows.

$$2^{Sv} \cdot 2^{Qvt}/2^{Av} = K \qquad (1)$$

Here, $2^{Qvt}$: quantity of reflected light illuminated by flash

K: a constant

A proper exposure for compensating a flash light to the object of brightness $Bv_{FL}$ be determined as follows.

$$2^{Sv}(2^{Qv} + 2^{BvFL - Tv})/2^{Av} = K$$

It is reformed as, $$2^{Sv} \cdot 2^{Qv - Av} + 2^{-\Delta Av} = K \qquad (2)$$

In this equation, $2^{-\Delta Av}$ corresponds to a quantity of light which lacks in the case of only with the ambient light to attain proper exposure and $2^{Sv} \cdot 2^{Qv-Av}$ corresponds to a quantity of flash light for compensating the lack. In addition, by reducing a predetermined level from a proper flash light control level which corresponds to the proper flash light quantity $2^{Qvt}$ only with the flash light, the desired flash light quantity $2^{Qv}$ at the exposure with flash light and ambient light can be attained. This can be represented as follows.

$$2^{Sv+\alpha} \cdot 2^{Qv-Av} = K \qquad (3)$$

Therefore, $\alpha$ is obtained and $Sv + \alpha$ is output to the D/A converter DA. Then, when the integrated voltage of the integral capacitor C in FIG. 5 reaches to a flash light level corresponds to $2^{Qv-Av+Sv+\alpha}$, i.e., to the constant K, a flash stop signal is transmitted to the flash device 6. Therefore, the quantity of reflected flash light is controlled to be $2^{Qv}$ and controll of a proper exposure is conducted as presented in the equation (2). The value $\alpha$ is calculated as follows. First, Qv is determined from the equations (1) and (2). If, $$(Qvt + Sv - Av) + \Delta Av = \beta$$

$$2^{Sv + Qv - Av} = 2^{-\Delta Av} \cdot (2^\beta - 1)$$

If the both sides are rearranged by applying $\log_2$, $$Qv = Av - \Delta Av + \log_2(2^\beta - 1) - Sv$$

Then, from the equations (1) and (3), $$\alpha = Qvt - Qv$$

is obtained and therefore, $$\alpha = Qvt + Sv - Av' - \log_2(2^\beta - 1)$$

On the other hand, in an APEX exposure calculation system, since K is standardized as $K = 2°$, $Qvt + Sv = Av$ from the equation (1). Therefore, $$\alpha = \Delta Av + \log_2(2^{\Delta Av} - 1) \qquad (4)$$

Then, at step S3 $\alpha$ is converted to data of the equation (4) by using $\Delta Av$ calculated at step S2, then at step S4 data $Sv + \alpha$ is input into the D/A converter DA.

When the integrated value of the light measurement, i.e., the integrated amount of ambient and flash light reflected by the surface of the film F reaches a predetermined level, the flashing is stopped. In this case, one of the integrated values, which is maximum, among the integrated values measured by nine light receiving elements $SP_{c1}$ to $SP_{c9}$, respectively, is used for stopping the flash light emission mentioned above. That is, flash light is desirably regulated according to the information from the receiving element which detects the maximum integrated value, since it is most probable, in general, that a portion of the object which located nearest from the camera is the main object to which irradiation of flash light is most desired.

Figure 9:
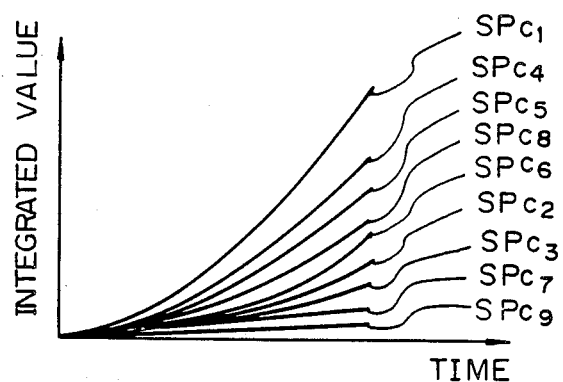
FIG. 9 is a view illustrating examples of the integrated values of the measured light measurements incidented to the multidivided photoelectric elements at the time of flashing.

FIG. 9 shows examples of the integrated values of the measured light quantities incidented to the multidivided photoelectrical elements SP at the time of flashing. In this case, flash light is regulated according to the light measurement by a light receiving element of which integrated value (corresponds to the maximum brightness $Bv_{max}$) is maximum. That is, the maximum light measurement is integrated by the integral capacitor C.

According to the above-mentioned embodiment, the object brightness $Bv_5$ measured by the central light receiving element $SP_{C5}$ at the time when the autofocussing is completed is used as an object brightness $Bv_{FL}$ for controlling the flash light and the aperture value $Av'$ in case of only with ambient light is calculated on the basis of the object brightness $Bv_{FL}$. However, any other embodiment will, of course, be possible. For instance, in another embodiment, the aperture value $Av'$ in case of only with ambient light can be calculated on the basis of an AE-locked object brightness $Bv_L$ at the time when light measurement is locked irrespective of the shutter release operation.

Figure 10:
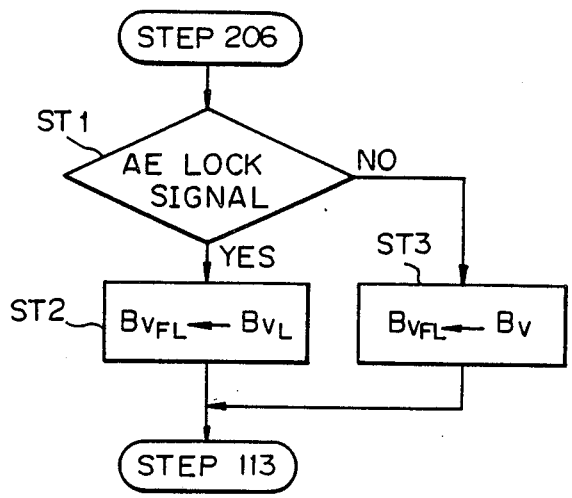
FIG. 10 is a flow chart of another embodiment, in which diaphragm aperture value is determined on the basis of only with the ambient light, in the AE locked condition.

Such an embodiment will now be described with reference to a flow chart shown in FIG. 10. AE lock is applied in which the main object is first placed at the center of the photographing picture area, such as a light receiving area by the central light receiving element $SP_{C5}$, and its light measurement is locked in response to the manual operation irrespective of the shutter release operation, and thereafter the photographing picture area is changed so that the main object is placed out of the light receiving area by the central element $SP_{C5}$ and, in this state, the shutter is released. AE lock is effected by manually operating an AE lock button (not shown) which is independent to the shutter release button. The output value from the A/D converter AD corresponding to the light measurement of the light receiving element $SP_{C5}$, when an AE lock signal is output in response to the above-mentioned manual button operation, is stored in a predetermined register.

The object brightness $Bv_L$ which is used for AE lock may be measured by the above-mentioned multidivided photoelectric elements SP, or may be measured by a single area photoelectric means, such as a spot or a center-weighted light receiving element.

At step ST1 whether the AE lock signal is output or not is checked. When AE lock signal is output, it moves to step ST2, at which an AE locked object brightness $Bv_L$ is stored in a register for storing an object brightness $Bv_{FL}$ for controlling the flash light ($Bv_{FL}=Bv_L$). When no AE lock signal is output at step ST1, it moves to step ST3 where the present (newest) object brightness Bv is stored in the register $Bv_{FL}$ ($B_{FL}=Bv$). The steps ST1 to ST3 are executed in place of steps 208 and 209 in FIG. 7. The calculation for the quantity of flash emission is executed on the basis of the object brightness $Bv_{FL}$ for controlling the flash light, in the same manner as the folw shown in FIG. 8.

The photographing in a state of AE lock as mentioned above makes it possible to desirably regulate the flash light according to the photographer's intention.

In addition, the following embodiments are also possible in accordance with this invention.

SECOND EMBODIMENT

Although, in the above-mentioned embodiment, the multidivided photoelectric elements SP includes nine light receiving elements $SP_{C1}$ to $SP_{C9}$ arranged laterally and longitudinally in a lattice, plural-divided photoelectric elements $SP_1$, constituted by a central circular light receiving element $SP_{C10}$ of which light receiving area including a distance measuring of focus condition detecting section and a peripheral light receiving element $SP_{C11}$, as seen from FIG. 11, can also be used.

In this case, an average value $(Bv_{10}+Bv_{11})/2$ of the two object brightnesses $Bv_{10}$ and $Bv_{11}$ measured by both light receiving elements $SP_{C10}$ and $SP_{C11}$ should be used as the average value $Bv_{mean}$ in step 205 in FIG. 7.

Where the AE locked object brightness $Bv_L$ is used as an object brightness $Bv_{FL}$ for controlling the flash light, an object brightness $Bv_{10}$ measured by the central light receiving element $SP_{C10}$ should be used as an AE locked object brightness $Bv_L$ ($Bv_{FL}=Bv_L=Bv_{10}$).

However, the aperture value Av and shutter speed value Tv at the time of flashing should be determined on the basis of the object brightness just before the release switch $S_2$ is turned on.

THIRD EMBODIMENT

In FIG. 12, multidivided photoelectric elements $SP_2$ are constituted by a central circular light receiving element $SP_{C12}$ of which light receiving area including a distance measuring of focus condition detecting section and peripheral four light receiving elements $SP_{C13}$ to $SP_{C16}$.

In this case, an average value $$\sum_{j=12}^{16} Bv_j/5$$

of object brightnesses $Bv_{12}$ to $Bv_{16}$ measured by all the light receiving elements $SP_{C12}$ to $SP_{C16}$ should be used as the average value $Bv_{mean}$ in step 205 in FIG. 7.

Where the AE locked object brightness $Bv_L$ is used as an object brightness $Bv_{FL}$ for controlling the flash light, an object brightness $Bv_{12}$ measured by the central light receiving element $SP_{C12}$ should be used as an AE locked object brightness $Bv_L$ ($Bv_{FL}=Bv_L=Bv_{12}$).

FOURTH EMBODIMENT

Figure 13:
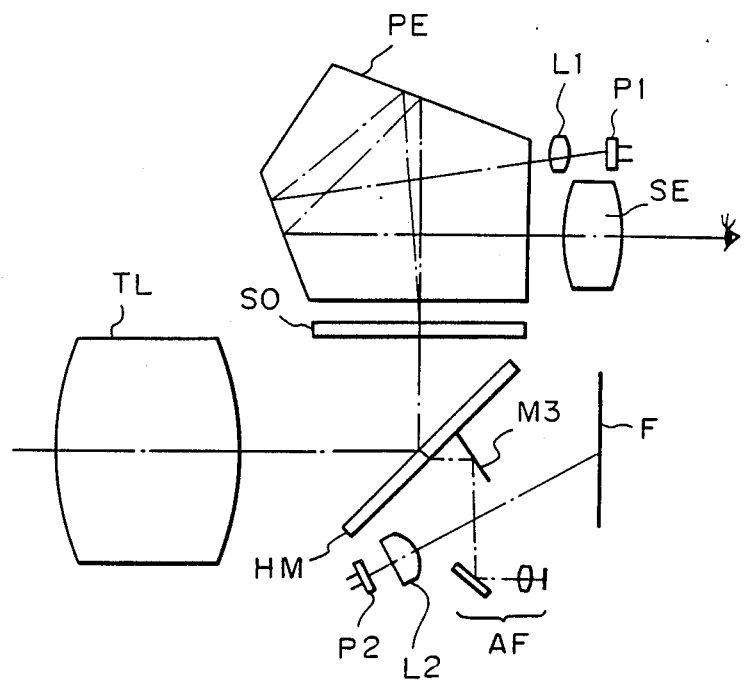
FIG. 13 is a schematic illustration of another optical system of the flash photographing apparatus.

FIG. 13 illustrates another embodiment of an optical system of a single lens reflex camera with a focal plane shutter mechansm, modified from that shown in FIGS. 1 and 2. Although, in the embodiment shown in FIGS. 1 and 2, the multidivided photoelectric elements SP are commonly used for both the light measurement necessary for calculating the aperture value Av and shutter speed Tv before flashing and the light measurement necessary for controlling the quantity of flash emission at flashing, the both light measurements may be conducted by separate light measuring means as the embodiment shown in FIG. 13.

In FIG. 13, reference mark L1 indicates a condensor lens for light measurement; and P1, multidivided photoelectric elements as shown in FIGS. 3, 11, or 12, or a single photoelectric element for spot or center emphasized light measurement, and located in the viewfinder system. P2 indicates multidivided photoelectric elements for controlling the quantity of flash emission at flashing in a flash mode; L2, a condenser lens for the elements P2; HM, a half mirror; and M3, an auxiliary mirror.

In this embodiment, steps 201 to 209 in FIG. 7 and steps S1 to S3 in FIG. 8 are executed on the basis of the light measurement obtained by the photoelectric element P1. On the other hand, controlling the quantity of flash emission to stop flashing is executed on the basis of the light measurements obtained by the multidivided photoelectric elements P2.

It is particularly important in this invention to adjust the flash emission by the difference between the exposure value defined by the aperture value and shutter speed value controlled in a flash mode and the proper exposure value of the main object only with the ambient light. Therefore, it is not necessary to determine the exposure value in a flash mode on the basis of maximum brightness $Bv_{max}$.

Figure 14:
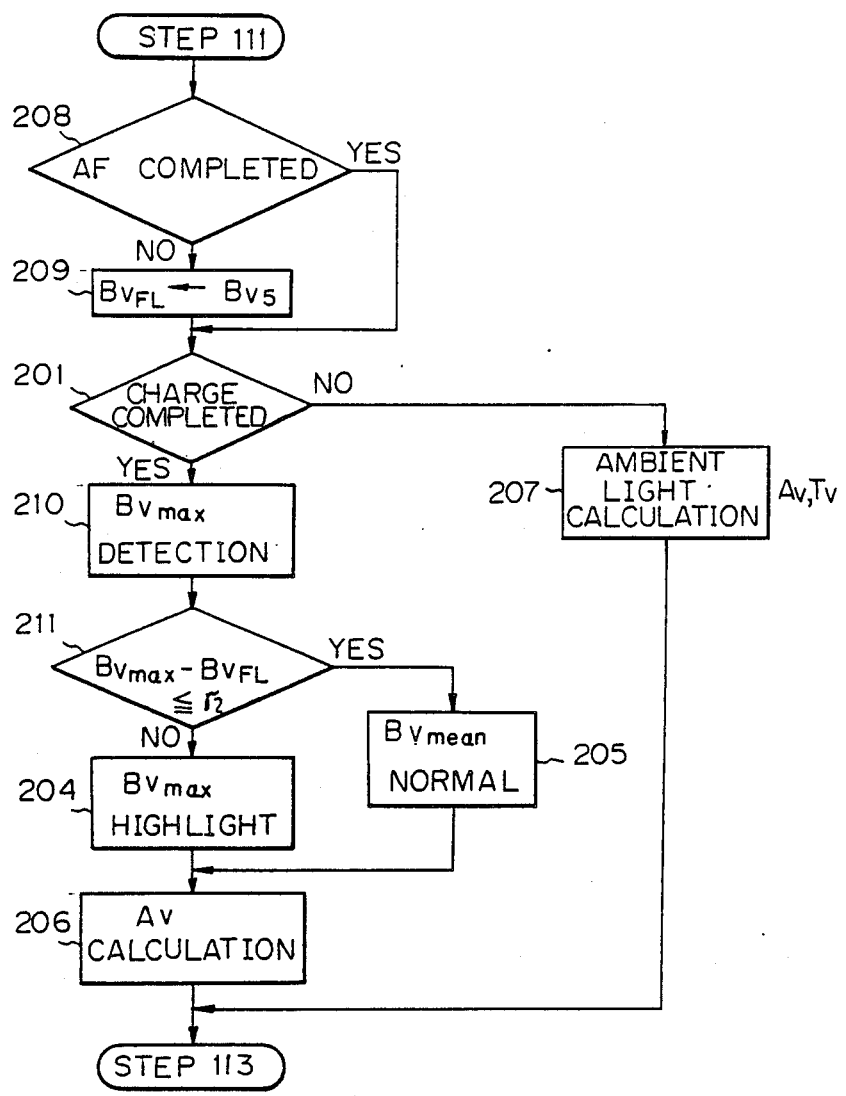
FIG. 14 is a detailed flow chart of another embodiment of the calculation for the exposure control data; and, FIGS. 15, 15A and 15B are a detailed flow chart of a further embodiment of the calculation for the exposure control data.

FIG. 14 illustrates another flow chart similar to FIG. 7, illustrating detailed flow for calculating the aperture value Av and shutter speed value Tv conducted at step 112 in FIG. 6. The common steps as the flow chart of FIG. 7 are indicated by the same reference numerals. Therefore, only the different steps will be described here.

If charge in the flash device 6 is completed (flash mode) at step 201, it moves to step 210, in which the maximum brightness $Bv_{max}$ is detected among the object brightnesses $Bv_1$ to $Bv_9$. Then, at step 211 the difference between the maximum brightnesses $Bv_{max}$ and $Bv_{FL}$ (the brightness of a central object at the time when autofocussing is completed or incompleted) previously obtained at steps 208 and 209 is calculated and whether difference ($Bv_{max} - Bv_{FL}$) is larger than a predetermined value $\gamma_2$ or not is checked. This serves to check whether the photographing condition is "rear light" or not.

In general, it is most probable that the central object at the time when the autofocussing is completed is a main object. In addition, "rear light" means a photographing condition in which there is a portion within the photographing picture area which is higher in brightness than the main object.

Therefore, in this embodiment, the "rear light" can be more precisely detected by determining a difference between the maximum brightness $Bv_{max}$ and the central main object brightness $Bv_{FL}$ and discriminating whether the difference ($Bv_{max} - Bv_{FL}$) is larger than the predetermined value $\gamma_2$ or not.

Figure 15A:
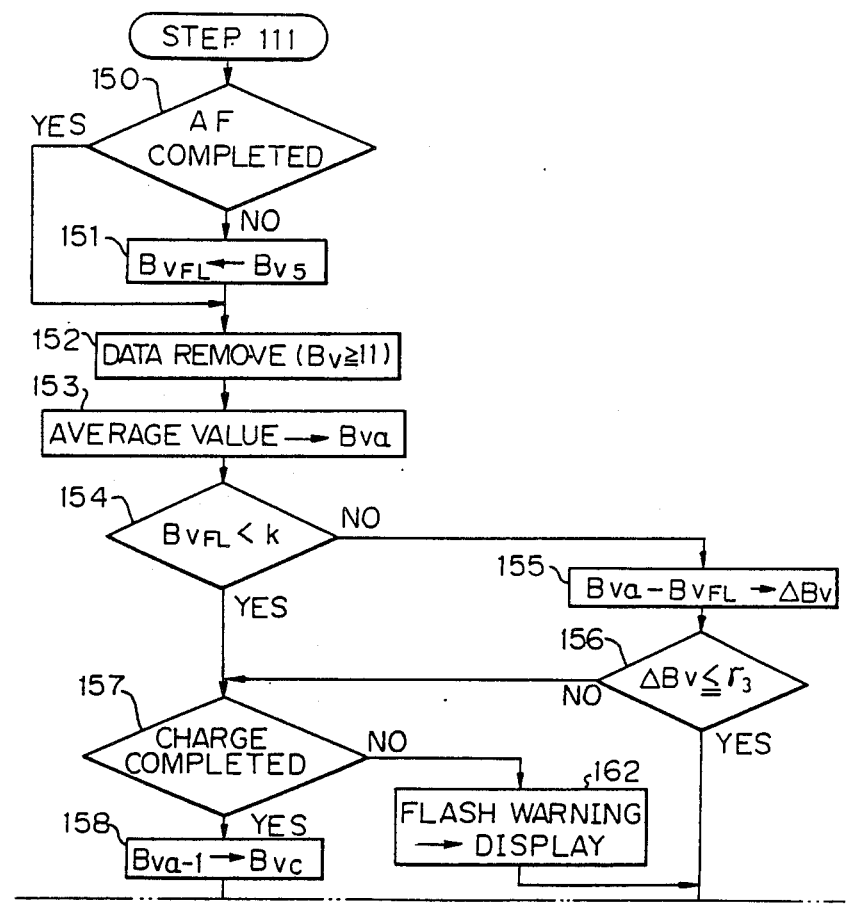
Figure 15B:
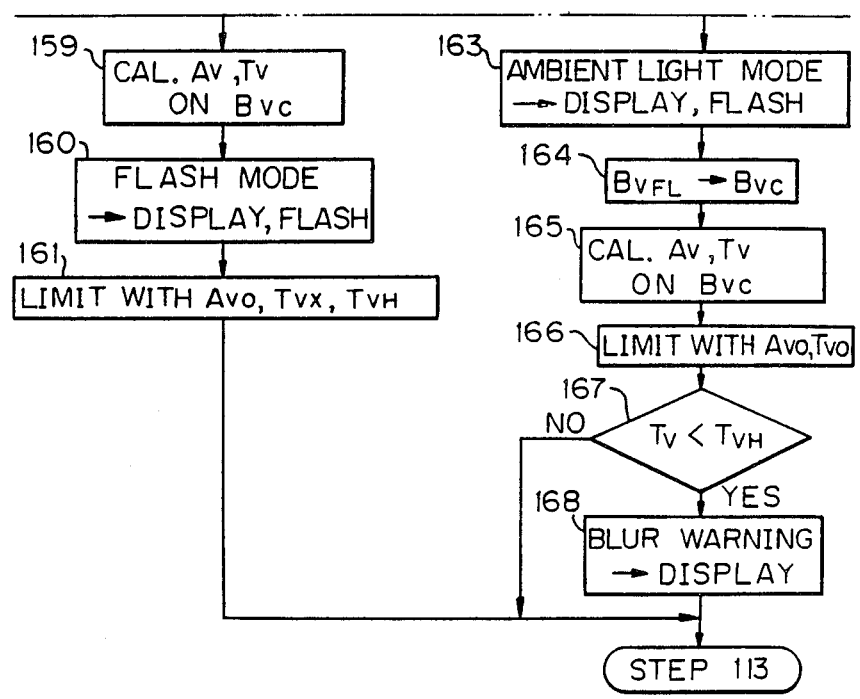

FIG. 15 is a flow chart of a further modified embodiment. In this embodiment, multidivided photoelectric elements arranged in a pattern as shown in FIG. 3 should be used. At steps 150 and 151, before the autofocussing is completed, the central brightness $Bv_5$ measured by the central light receiving element $SP_{C5}$ of which light receiving area including a focus condition detecting area is renewed, in turn, as $Bv_{FL}$. When the autofocussing is completed, the renewal is stopped. Therefore, the light measurement $Bv_5$, at the time when the photographing lens is in an in-focus position, is AE locked. More precisely, the light measurement $B_{V5}$, just before the photographing lens is moved or drived to an in-focus position, is AE locked. However, no problem will occur, since one loop of CPU operation is carried in very high speed (in a short time). Otherwise, just after the autofocussing is completed, the light measurement $Bv_5$ may be renewed once more for more precise control, if necessary.

Then, at step 152 any photoelectric values among the brightnesses $Bv_1$ to $Bv_4$ and $Bv_6$ to $Bv_9$ which are larger than a predetermined value (such as, $Bv=11$) are removed, since it is suspected that high brightness light source, such as the sun, exists in the corresponding light receiving regions. At step 153 an average value (average of addition) of the remaining photoelectric values is used as a sub object brightness $Bv_a$. Then, at step 154 whether the main object brightness $Bv_{FL}$ is equal to or smaller than a predetermined value k is checked and, if it is smaller than k (i.e., low brightness), it moves to step 157 to prepare flashing and, on the other hand, if it is larger than k, it moves to step 155.

Here, $k = Av_O + Tv_H - Sv$ $Av_O$: full open diaphragm aperture value
$Tv_H$: shutter speed value limited for preventing the camera blur due to camera holding
$Sv$: film sensitivity At step 155 a difference $\Delta Bv$ between the main object brightness and the sub object brightness is calculated by operating $Bv_a - Bv_{FL}$ and at step 156 whether the difference $\Delta Bv$ is not larger than a predetermined value $\gamma_3$ or not is checked (for instance, $\gamma_3 = 2$). If the difference $\Delta Bv$ is not larger than $\gamma_3$, it is considered that the photographing condition is not "rear light" and it moves to step 163 which is a flow of the ambient light photographing mode. If the difference $\Delta Bv$ is larger than $\gamma_3$, it is considered that the photographing condition is "rear light" and it moves to step 157.

At step 157 whether the charge in the flash device 6 is completed or not is checked on the basis of a signal from the flash 6. If a charge completion signal is not still input, it is considered that the flash is not still mounted on the camera, or a flash main switch (not shown) is not closed even if the flash device 6 is already mounted on, or the main capacitor in the flash device 6 is not still charged above a given level even if the main switch is already closed. In this state, flashing cannot be effected. Therefore, at step 162 a flash warning signal is transmitted to the display 8 to warn that an ambient light photographing mode is reluctantly applied.

At step 157 if the charge in the flash device 6 is completed, it moves to step 158 in which a control brightness $Bv_C$ is determined by reducing 1 Ev from the sub object brightness $Bv_a$. Therefore, the sub object can be photographed in overexposure by 1 Ev with respect to the proper exposure value and thus a photograph of "rear light" mood (that is, actual sight mood) can be obtained. Then, at step 159 an aperture value Av and shutter speed value Tv are determined on the basis of the control brightness $Bv_C$. At step 160 a flash mode signal is transmitted to the display 8 to display these information and to the flash device 6, which is thus set in such a condition that flash emission is effected when the X contact Sx is closed. At step 161 the aperture value Av is limited by the full open diaphragm aperture value $Av_O$ and the shutter speed value Tv is also limited within a range between $Tv_H$ (shutter speed limited for preventing the camera blur due to camera holding) and $Tv_X$ (flash synchronizable limit of shutter speed). Then, it moves to step 113 in FIG. 6.

In an ambient light photographing mode, at step 163 a signal indicating the ambient light mode is transmitted to the display 8 to display this situation and to the flash device 6 to set in such a condition that no flashing is effected even if the X contact Sx is closed. Then, at step 164 the control brightness $Bv_C$ is used as the brightness $Bv_{FL}$ of the main object. Therefore, in ambient light photographing mode, the main object of proper exposure can be photographed even if the sub object is considerably shifted from the proper exposure value. Then, at step 165 an aperture value Av and shutter speed value Tv are determined on the basis of this control brightness $Bv_C$. At step 166 the aperture value Av is limited by a full open diaphragm aperture value $Av_O$ and the shutter speed value Tv is also by a predetermined longest shutter speed $Tv_O$. Then, at step 167 whether the shutter speed value Tv is longer than the shutter speed $Tv_H$ which is limited for preventing the camera blur due to camera holding. If Tv is longer than $Tv_H$, a signal for warning the possibility of camera blur due to camera holding is transmitted to the display 8 to display this situation. If Tv is not longer than $Tv_H$, it moves to step 113 in FIG. 6.

In the above embodiments, the actual light measurements contain some diaphragm factors concerning a full open diaphragm aperture value $Av_O$, compensation value for full opened light measuring, and the like. However, these factors can be read out from the lens ROM 2 and removed from the light measurements, although the explanation thereof is omitted in this specification for simplicity.

We claim:

1. A flash photographing apparatus including a camera and an electric flash device, comprising:
   first light measuring means for measuring a brightness of light incident from a main object in a particular light receiving region within a camera photographing area and outputting first brightness information in response to this light measurement;
   second light measuring means for measuring a brightness of light incident from a sub object in a region within said camera photographing area other than said particular light receiving region and outputting second brightness information in response to this light measurement;
   first means for calculating exposure control data for flash photography on the basis of the second brightness information;
   means for controlling a diaphragm aprerture and shutter speed of said camera according to the exposure control data;
   second means for calculating data for controlling a quantity of flash light emission according to a difference between said first and second brightness information; and,
   means for controlling the quantity of flash light emission on the basis of the flash emission controlling data.

2. An apparatus as set forth in claim 1, further comprising:
   a photographing lens having a focus adjusting mechanism; and,
   means for detecting a focus condition of said photographing lens on the basis of an incident light received in a particular focus detecting region through said photographing lens, and driving said focus adjusting mechanism to an in-focus position of said photographing lens; wherein
   the particular focus detecting region corresponds to the particular light receiving region of said first light measuring means, and the first brightness information is a brightness information at the time when said photographing lens is in the in-focus position.

3. An apparatus as set forth in claim 1, further comprising:
   means for storing the first brightness information according to a manual operation; wherein the particular light receiving region of said first light measuring means is located at a center of the camera photographing area, and the first brightness information is a brithtness information when said storing means is manually operated.

4. A flash photographing apparatus including a camera and an electronic flash device, comprising:
   first light measuring means for measuring a brightness light incident luminance from a main object in a particular light receiving region within a camera photographing area and outputting first brightness information in response to this light measurement;
   second light measuring means for measuring a brightness of light incident from a sub object in a region within said camera photographing area other than said particular light receiving region and outputting second brightness information in response to this light measurement;
   means for discriminating whether a difference between the first and second brightness information exceeds a given level or not;
   means for calculating, operative when it is discriminated that the difference exceeds the given level, exposure control data on the basis of the second brightness information so that exposure for said sub object with ambient light be overexposure with respect to a proper exposure value;
   means for controlling a diaphragm aprerture and shutter speed of said camera according to the exposure control data,
   means for controlling the quantity of flash light emission on the basis of light which is reflected by the object illuminated by said electronic flash device.

5. An apparatus as set forth in claim 4, further comprising:
   a photographing lens having a focus adjusting mechanism; and,
   means for detecting a focus condition of said photographing lens on the basis of an incident light received in a particular focus detecting region through said photographing lens and, driving said focus adjusting mechanism to an in-focus position of said photographing lens; wherein
   said particular focus detecting region corresponds to the particular light receiving region of the first light measuring means, and the first brightness information is a brightness information at the time when said photographing lens is in the in-focus position.

6. An apparatus as set forth in claim 4, further comprising:
   means for storing the first brightness information according to a manual operation; wherein
   the particular light receiving region of said first light receiving means is located at a center of the camera photographing area, and said first brightness information is a brightness information when said storing means is namelly operated.

7. An apparatus as set forth in claim 4, wherein
   said second light measuring means comprises a plurality of light receiving regions and outputting a plurality of brightness information corresponding to said plurality of light receiving regions as the second brightness information; and
   said exposure calculating means determines a maximum brightness among the plurality of brightness information and calculates exposure control data so that the maximum brightness be in the vicinity of an upper limit of film latitude.

8. A flash photographing apparatus including a camera and an electronic flash device, comprising:

a first light measuring means for measuring a brightness of light incident from a main object in a particular light receiving region within a camera photographing area and outputting first brightness information in response to this light measurement;

second light measuring means for measuring a brightness of light incident from a sub object in a region within said camera photographing area other than said particular light receiving region and outputting second brightness information in response to this light measurement;

means for discriminating whether a difference between the first and second brightness information exceeds a given level or not;

first means for calculating, operative when it is discriminated that the difference exceeeds the given level, exposure control data on the basis of the second brightness information so that exposure for said sub object with ambient light be overexposure by a predetermined value with respect to a proper exposure value;

means for controlling a diaphragm aprerture and shutter speed of said camera according to the exposure control data;

second means for calculating data for controlling a quantity of flash light emission according to a difference between the exposure control data calculated by said first calculating means and an exposure control data which is determined on the basis of the first brightness information so that exposure with ambient light be a proper exposure value; and, means for controlling the quantity of flash light emission on the basis of the flash controlling data.

9. An apparatus as set forth in claim 8, further comprising:

a photographing lens having a focus adjusting mechanism; and, means for detecting a focus condition of said photographing lens on the basis of an incident light received in a particular focus detecting region through said photographing lens and, driving said focus adjusting mechanism to an in-focus position of said photographing lens; wherein the particular focus detecting region corresponds to the particular light receiving region of said first light receiving means, and the first brightness information is a brightness information at the time when said photographing leans is in the in-focus position.

10. A flash photographing apparatus including a camera and an electronic flash device, comprising:

a first light measuring means for measuring a brightness of light incident from a main object in a particular light receiving region within a camera photographing area and outputting first brightness information in response to this light measurement;

second light measuring means for measuring a brightness of light incident from a sub object in a region within said camera photographing area other than said particular light receiving region and outputting second brightness information in response to this light measurement;

means for calculating exposure control data on the basis of the second brightness information so that exposure for said sub object with ambient light be overexposure by a predetermined value with respect to a proper exposure value;

means for controlling a diaphragm aprerture value and shutter speed of said camera according to the exposure control data; and, means for controlling the quantity of flash light emission on the basis of light which is reflected by the object illuminated by said electronic flash device.

11. An apparatus as set forth in claim 10, wherein said flash emission control means comprises:

second means for calculating data for controlling a quantity of flash light emission according to a difference between the exposure control data calculated by said first calculating means and an exposure control data which is determined on the basis of the first brightness information so that exposure with ambient light be a proper exposure value; and, means for controlling the quantity of flash light emission on the basis of the flash controlling data.

12. A flash photographing control apparatus, comprising:

a plurality of light measuring means for measuring a plurality of brightness, respectively, of incident light received by a plurality of light receiving regions corresponding to a plurality of divided photographing picture areas and outputting a plurality of brightness signals corresponding to the respective light measurements; and, means for outputting a maximum brightness signal among the plurality of brightness signals;

mean for integrating the maximum brightness signal during flashing; and, means for controlling a quantity of flash light emission so that flashing is stopped when the integrated value reaches a predetermined value.

* * * * *